US 6,637,782 B2

(12) United States Patent
Fiebig

(10) Patent No.: US 6,637,782 B2
(45) Date of Patent: Oct. 28, 2003

(54) END-SIDED CLOSURE OF A PIPE

(75) Inventor: Klaus Dieter Fiebig, Reinbek (DE)

(73) Assignee: Dockweiler AG, Neustadt-Glewe (DE)

(*) Notice: Subject to any disclaimer, the term of this patent is extended or adjusted under 35 U.S.C. 154(b) by 0 days.

(21) Appl. No.: 10/107,171

(22) Filed: Mar. 27, 2002

(65) Prior Publication Data
US 2002/0180214 A1 Dec. 5, 2002

(30) Foreign Application Priority Data
May 30, 2001 (DE) .......................... 101 26 180

(51) Int. Cl.$^7$ ............................................. F16L 55/115
(52) U.S. Cl. ...................... 285/373; 138/89; 285/368; 285/917
(58) Field of Search ................... 285/373, 917, 285/363, 368; 138/89

(56) References Cited

U.S. PATENT DOCUMENTS

| 608,613 | A | * | 8/1898 | Linich | 285/337 |
|---|---|---|---|---|---|
| 973,794 | A | * | 10/1910 | Lightcap | 15/104.061 |
| 1,389,542 | A | * | 8/1921 | Wereley | 220/327 |
| 1,678,946 | A | * | 7/1928 | Joyce | 220/319 |
| 1,712,232 | A | * | 5/1929 | Rothfus | 220/266 |
| 2,612,286 | A | * | 9/1952 | Stufft | 220/327 |
| 2,746,486 | A | * | 5/1956 | Gratzmuller | 138/89 |
| 3,613,939 | A | * | 10/1971 | Ehle | 220/240 |
| 3,964,520 | A | * | 6/1976 | Baas | 138/89 |
| 5,010,957 | A | * | 4/1991 | Kenner | 166/379 |
| 6,363,973 | B1 | * | 4/2002 | Fiebig | 138/89 |

FOREIGN PATENT DOCUMENTS

DE 199 47 473 C1 6/2001

* cited by examiner

Primary Examiner—Eric K. Nicholson
(74) Attorney, Agent, or Firm—Vidas, Arrett & Steinkraus P.A.

(57) ABSTRACT

An end-sided closure of a pipe having the following features:
  a flanged-socket metallic member one end of which is welded to the pipe to be closed and the other end of which is designed for being orbitally welded to a pipe joining it and the outer surface of which has formed thereon an annular flange which has axially parallel threaded bores at circumferential spacings,
  a cap-shaped closing member adapted to be placed onto the other end of the flanged-socket member with a ceiling portion and an annular wall portion wherein the inner surface of the ceiling portion is adapted to sealingly bear against the front-end face of the other pipe end and wherein the wall portion has axially parallel through bores which can be aligned with the threaded bores, and
  headed screws which are adapted to be inserted through the through bores from the ceiling portion and can be turned into the threaded bores wherein the heads of the screws bear against an abutment surface of the sealing portion in order to press the inner surface of the sealing portion against the front-end face of the other end when the screws are tightened.

10 Claims, 2 Drawing Sheets

END-SIDED CLOSURE OF A PIPE

CROSS-REFERENCE TO RELATED APPLICATIONS

Not Applicable

STATEMENT REGARDING FEDERALLY SPONSORED RESEARCH

Not Applicable.

BACKGROUND OF THE INVENTION

If pipes are used for carrying media such as a gas it is necessary again and again to close a pipe end. Such a pipe closure may be required, for example, by the fact that a pipe line is not intended to be continued for a period of time. It is particularly in pipe line systems which are to be completed in several stages that there is frequently a need to temporarily close pipe lines that are intended to be extended later for a completion of the pipe line system. However, it may also be expedient to temporarily close the system while under construction to avoid contamination, for example.

For a closure of pipe line systems, it is known to weld a cap onto the end of the pipe. The disadvantage of such a closure of the pipe is that metal chips and impurities will be formed while the cap is separated. Such impurities require great expenditure in preparation before the pipe line is used again, specifically in pipes used in semiconductor factories, pharmaceutical installations or other points of application where increased demands are made to cleanliness. Before a restart of the pipe line, it is often necessary to thoroughly rinse the pipe line, which is time-consuming and involves high cost.

Also, proposals were made already to provide a device for closing a pipe at its end side, which is easy to manufacture, will tightly close the pipe, and can be easily removed therefrom without leaving behind any residues. To this end, one end of a flanged-socket metallic member is welded onto the pipe to be closed while its other end is designed for being orbitally welded onto a pipe joining it. The outer surface of the flanged-socket member has a chamfered surface which can be located at least axially towards the other end. A closing member adapted to be placed onto the other end of the flanged-socket member has a sealing surface adapted to bear against the front-end face of the other pipe and a second, circumferential outer chamfered surface. Such a device is suited for use in closing a pipe end to make it highly gas-tight. The flanged-socket member is fixed to the pipe to be closed, e.g. by welding it thereto. The clip which grips around the flanged-socket member, when mounted, presses the closing member onto the flanged-socket member. The advantage of the invention is that more pipes may be connected to the flanged-socket member once the closing member has been removed. Here, the form of the flanged-socket member is such that a further pipe may be fixed by orbital welding to the flanged-socket member. The removal of the clip and the closing member is easy and implies no entry of dirt or impurities into the flanged-socket member or pipe.

It is the object of the invention to provide an end-sided closure for a pipe which can be simplified even more and is particularly easy to handle.

BRIEF SUMMARY OF THE INVENTION

At its outer surface, the end-sided closure according to the invention has a flanged-socket member which is welded onto the pipe to be closed. Its end is designed for being orbitally welded and is provided with a highly gas-tight closure. To this end, an annular flange which has axially parallel threaded bores at circumferential spacings can be formed on the flanged-socket member. Further, a closing member is provided which is designed in a cap shape and has a ceiling portion and an annular wall portion and is adapted to be placed onto the free end of the flanged-socket member. Here, the inside diameter of the wall portion of the cap-shaped closing member approximately corresponds to the outer diameter of the flanged pipe socket. At this point, the free end of the flanged pipe socket comes to sealingly bear against the inner face of the ceiling portion so as to form a metallic sealing.

The wall portion of the cap-shaped closing member has a series of through bores which are disposed at a circumferential spacing, are lined up in an axially parallel relationship, and can be aligned with the threaded bores in the annular flange. Finally, screws are provided which can be introduced into the through bores from the ceiling portion of the closing member and can be turned into the threaded bores of the flange to firmly press the cap-shaped portion against the free end of the flanged pipe socket. In this way, a tight closure that is efficient even if pressures or pressure differentials are very high will be obtained at the free end of the flanged pipe socket. In any case, this ensures that the pipe is closed so as to make it highly gas-tight at an approximate tightness of about $10^{-9}$ 1 annually. The flanged-socket member and the closing member specifically employ alloys of V4A steel. Using silver is advantageous, too.

The annular flange of the flanged-socket member is preferably rectangular in cross-section. However, this is irrelevant for the efficiency of the inventive assembly.

According to another aspect of the invention, the through bores terminate in outer pockets of the ceiling portion which receive the heads of the screws. This ensures that the screws do not protrude beyond the outer contour of the closing member so as to possibly form a danger of lesion. The countersunk arrangement of the screw heads is also ensured when the annular edge is provided with a pronounced chamfer between the wall portion and the ceiling portion.

According to an aspect of the invention, a flat metallic sealing ring preferably made of nickel can be disposed between the other end of the flanged-socket member and the inner surface of the closing member in order to further improve the sealing. For this purpose, according to another aspect of the invention, the inner surface of the ceiling portion can be provided with a circumferential shoulder which is close to the wall portion and against which the sealing ring will bear.

To further improve their accessibility by a tool, the head of the screws preferably have a hexagon socket.

BRIEF DESCRIPTION OF THE SEVERAL VIEWS OF THE INVENTION

The invention will now be explained in more detail with reference to the drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
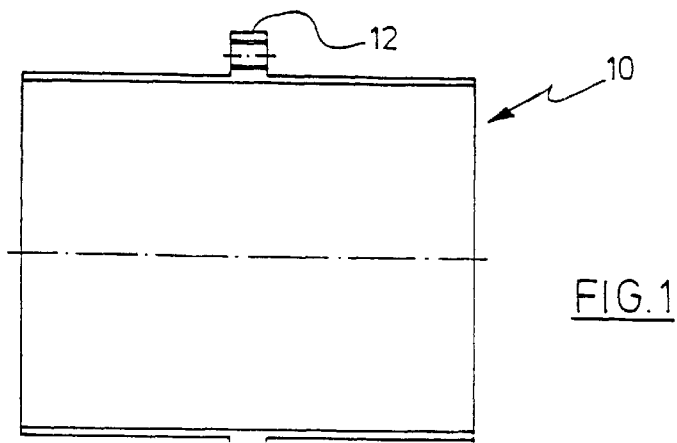
FIG. 1 shows a sectional side view of a flanged-socket member according to the invention.

A flanged-socket member 10 as shown in FIG. 1 is of a tubular shape and has a uniform diameter and a uniform thickness along its length. It is made of V4A steel, for example. At its circumference, it has formed integrally thereto an annular flange 12 which is rectangular in cross-section. The flange has threaded through bores 14 at circumferential spacings.

One end of the flanged-socket member 10 is welded to a pipe having the same dimensions, preferably by orbital welding, so that no residues will be left behind. By the way, the other end of the pipe is designed in the same manner so as to make it usable for orbital welding. The flanged-socket member is symmetrical with respect to its central plane, by which fact it does not matter by which end to weld it onto the pipe which is not shown.

Figure 2:
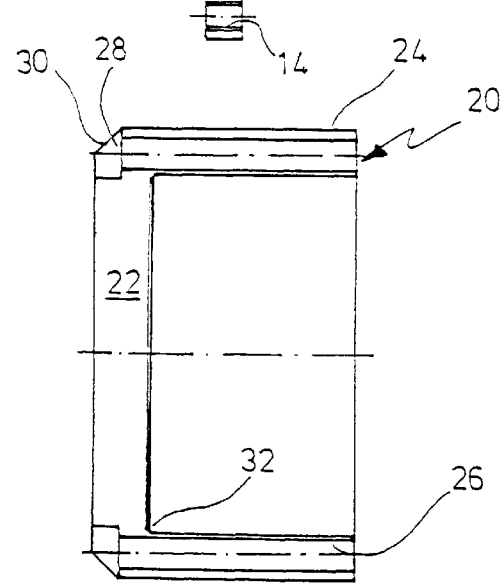
FIG. 2 shows a section of a closing member according to the invention.

A closing member 20 of FIG. 2 is of a cap shape and has a ceiling portion 22 and an annular wall portion 24 the inside and outside of which are cylindrical. The inner diameter of the wall portion 24 corresponds to the outer diameter of the flanged-socket member 10.

Figure 5:
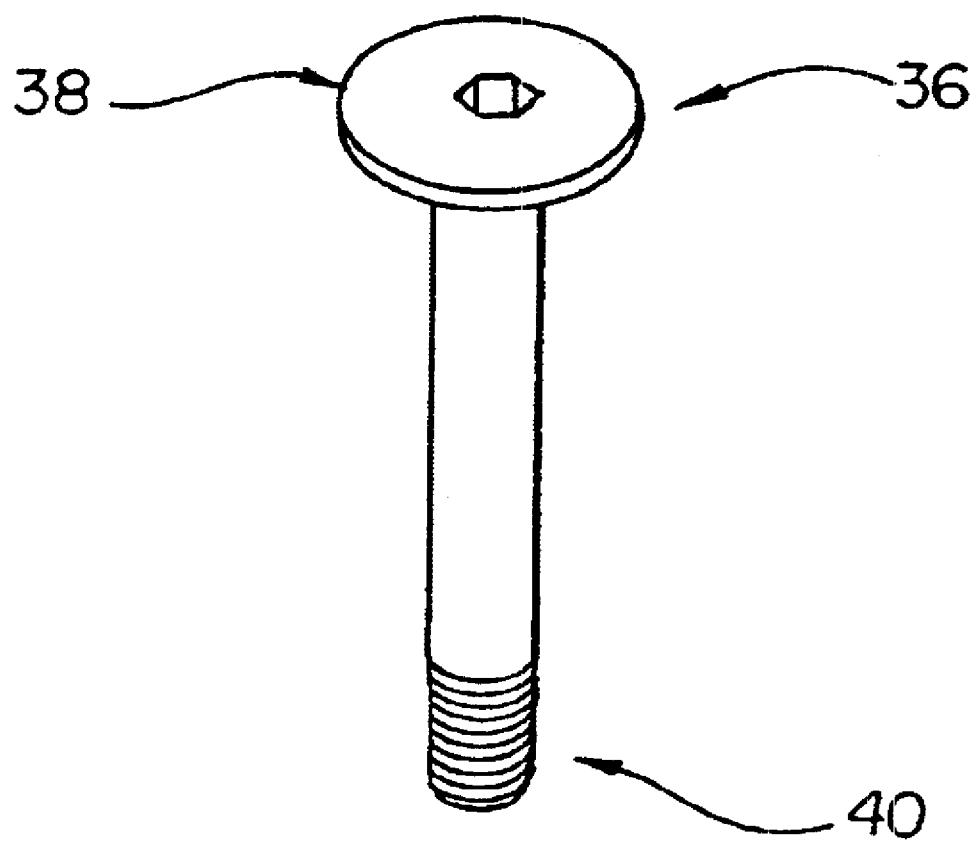
FIG. 5 is a perspective view of a headed screw.

The closing member 20 has a series of axially parallel, circumferentially spaced through bores 26, which terminate in pockets 28 towards the ceiling portion 22. The through bores 26 receive long screws 36 shown in FIG. 5. The screws 36 are threaded portion 40 at the free end region and heads 38 which come to lie in the pockets 28 with the heads 34 being largely accommodated by the pockets 28 so that the head does not protrude unnecessarily. This is a fact despite a chamfer 30 that bevels the outer annular edge of the ceiling portion 22. The through bores 26 may be aligned with the threaded bores 14.

Figure 3:
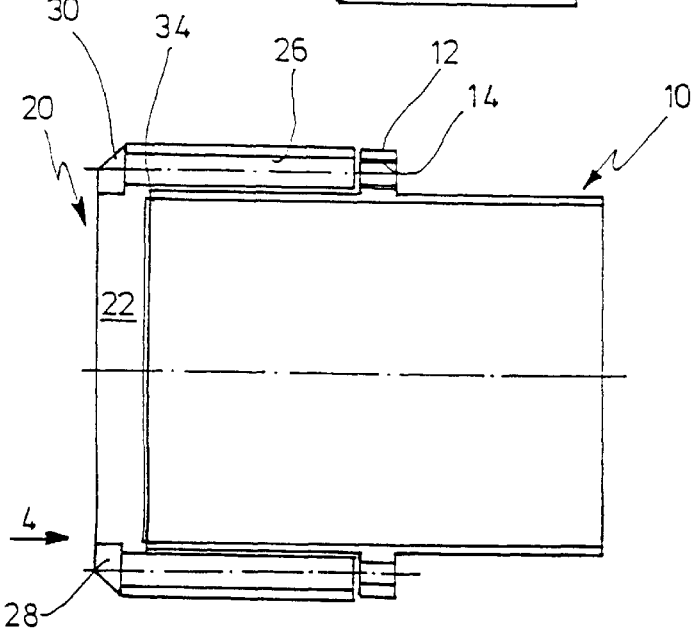
FIG. 3 shows a detail of the closing member of FIG. 2.
Figure 4:
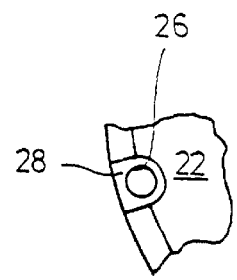
FIG. 4 is a partial top view of FIG. 3.

The way the closing member 20 is pushed onto the left-hand part of the flanged-socket member 10 is apparent from FIG. 3. A thin, flat sealing member 34, e.g. made from nickel, is disposed between the free end of the flanged-socket member 10 and an annular shoulder 32 at the inner surface of the ceiling portion close to the wall portion 24. As described, the screws are passed through the through bores 26 and their threads are screwed into the threaded bores 14 so as to apply a tensile force to between the closing member 20 and the end of the flanged-socket member 10 facing it, which force sealingly draws the elements against each other so as to form a highly gas-tight closure.

Now, if it is desirable, for purposes of extension, to mount another pipe on the pipe (not shown) onto which the flanged-socket member 10 is welded the closing member 20 is removed by loosening the screws (not shown) and the other pipe can now be welded onto the exposed end of the flanged-socket member 10 by using the orbital welding process.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A closure for closing an end of a pipe of metallic material, comprising
    a pipe section of metallic material having a first and a second end, an outer diameter, and an axis, the first end being welded to the end of the pipe, the second end being designed to be welded to a further pipe by orbital welding to join the first pipe;
    an outer annular flange portion integrally formed with the pipe section between the ends thereof, the annular flange portion having a plurality of circumferentially spaced threaded screw bore extending parallel to the axis of the pipe section;
    a cap-shaped closing member having a cylindrical wall portion wit an inner diameter and a ceiling portion with a side and an inner surface, the inner diameter of the wall portion being substantially equal to the outer diameter of the pipe section and the inner surface of the ceiling portion being adapted to sealingly engage the second end of the pipe portion,, the wall portion having a plurality of circumferentially spaced elongated through bores extending parallel to the axis of the pipe section and being adapted to be aligned with the bores of the flange portion of a closing member if pushed onto the second end of the pipe section, and
    elongated screw bolts having a head and a free end region, a threaded portion being at the free end region, the screw bolts being adapted to be inserted into the elongate through bores of the closing member from the side of the ceiling portion and to engage a threaded bore of the flange portion in order to sealingly press the ceiling portion against the second end of the pipe portion.

2. The closure according to claim 1, characterized in that the leakage rate is less than $10^{31\ 9}$ millibar.1.sec or $10^{-9}$ 1 annually.

3. The closure according to claim 1, characterized in that the flange (12) is rectangular in cross-section.

4. The closure according to claim 1, characterized in that the through bores (26) terminate in outer pockets (28) of the ceiling portion (22) which receive the heads of the screws.

5. The closure according to claim 1, characterized in that a flat metallic sealing ring (34) is disposed between the other end of the flanged-socket member (10) and the ceiling portion (22).

6. The closure according to claim 1, characterized in that the inner surface of the ceiling portion (22) has a circumferential shoulder (32) which is close to the wall portion (24) and against which the sealing ring (34) will bear.

7. The closure according to claim 1, characterized in that the threaded portion of the screws is only provided in the free end region.

8. The closure according to claim 1, characterized in that the bolt head has a hexagon socket.

9. The closure of claim 8 wherein the flat metallic sealing ring is made of nickel.

10. The closure of claim 1 wherein the pipe section is symmetrical having the flange portion in the center of the pipe section.